United States Patent [19]

Ward

[11] 4,142,191
[45] Feb. 27, 1979

[54] LASER APPARATUS

[75] Inventor: Brooke A. Ward, Goring-on-Thames, England

[73] Assignee: United Kingdom Atomic Energy Authority, London, England

[21] Appl. No.: 827,184

[22] Filed: Aug. 23, 1977

[30] Foreign Application Priority Data

Aug. 24, 1976 [GB] United Kingdom ............... 35222/76

[51] Int. Cl.² .......................... G01D 15/10; H01S 3/23
[52] U.S. Cl. .................................... 346/76 L; 330/4.3; 358/297
[58] Field of Search .................... 330/4.3; 331/94.5 C; 346/76 L; 358/297

[56] References Cited

U.S. PATENT DOCUMENTS

| 3,453,559 | 7/1969 | Sharp et al. | 331/94.5 C |
| 3,514,709 | 5/1970 | Jacob | 331/94.5 C |
| 3,564,454 | 2/1971 | Hook et al. | 331/94.5 C |
| 3,668,536 | 6/1972 | Michon | 330/4.3 |
| 3,895,313 | 7/1975 | Seitz | 331/94.5 C |
| 4,006,426 | 2/1977 | Lacour | 330/4.3 |
| 4,039,962 | 8/1977 | Hughes | 330/4.3 |

OTHER PUBLICATIONS

Seka et al., "An Optical Discrimination Amplifier", 11/74, pp. 341-343, Optics Communications, vol. 12, #3.

Primary Examiner—Nelson Moskowitz
Attorney, Agent, or Firm—Sughrue, Rothwell, Mion, Zinn and Macpeak

[57] ABSTRACT

In a multi-section laser amplifier, the amount of amplification available for a given number of sections is increased by passing a polarized beam of light through the initial sections of the laser amplifier twice, in opposite directions, and preventing its re-emergence at its initial point of entry by polarization discriminating means.

6 Claims, 3 Drawing Figures

LASER APPARATUS

In a multi-section laser amplifier, light entering a first section of the laser amplifier through a window travels along the first section to an end mirror by means of which it is reflected along a second section to a second end mirror and so on, until the light passes through an exit window at the end of the final section.

A method according to the present invention comprises passing polarised light into the laser amplifier at an entry point located along the said path between the ends and directing the light from the said entry point towards the first end of the laser amplifier, redirecting the light from the first end of the laser amplifier through the sections of the multi-section laser amplifier to the exit end, and turning the plane of polarisation of the light through 90° and preventing the light with the changed plane of polarisation from emerging at the said entry point between the ends, whereby there is obtained from the exit window, light which has passed twice in opposite directions through an initial part of the multi-section laser amplifier. The gain of a laser amplifier is linear for small input signals and provided that the signal is not amplified to a level of saturation, the extracted power from a multi-section laser amplifier is exponentially proportional to the number of sections. The degree of saturation varies along the length of the multi-section laser amplifier. Thus in an unsaturated amplifier, if the same section can be used twice, i.e., if the injected beam travels along it twice, an additional amount of power can be extracted from the amplifier. The benefit of double passing clearly declines as the beam power reaches the saturation limit.

By this double utilisation of the laser amplifier, a reduction in cost and size of the laser amplifier is accomplished.

In the preferred form of apparatus embodying the invention, polarised light to be amplified enters the multi-section laser amplifier through the end of an intermediate section and passes back through the early stages of the amplifier to be reflected at the front end by a mirror positioned for normal incidence of the beam. Between the front end and the mirror is an optical element which rotates the plane of polarisation of the beam through 90°. Upon reflection, the beam passes again through the early stages into the later stages of the laser amplifier and through the exit window. A polarisation-sensitive element causes reflection of the beam at its point of entry, whereby the beam is directed into the remainder of the laser amplifier.

In order that the invention may be better understood, an example of the known multi-section laser amplifier and an example of apparatus embodying the present invention will now be described with reference to the accompanying drawings, in which.

Figure 1:
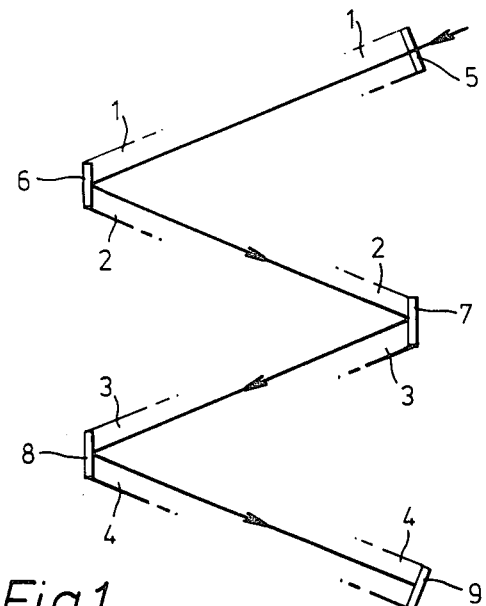
FIG. 1 illustrates the known multi-section laser amplifier.

In the multi-section laser amplifier shown in FIG. 1, light enters the window 5 and after passing down the amplifier section 1 is reflected by a reflector 6 into the section 2. In a similar manner, it is thereafter reflected by respective reflectors 7 and 8 into the third and fourth sections 3 and 4 of the laser amplifier. At the end of the fourth section, the light emerges through an exit window 9.

Figure 2:
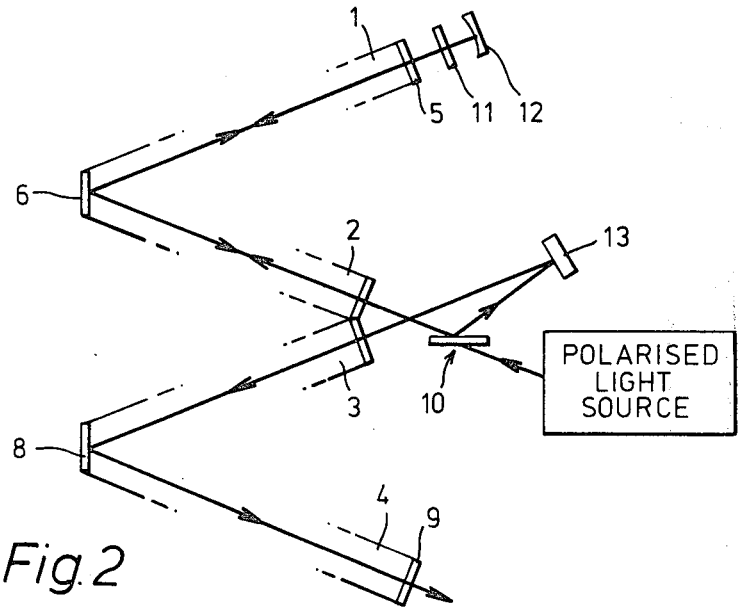
FIG. 2 illustrates laser-beam generating apparatus embodying the invention.

In FIG. 2, the laser amplifier of FIG. 1 has been modified so as to embody the present invention. Suitably polarised light now enters the laser amplifier through a polarisation discrimination element 10 (in this example a Brewster angle polarisation element) to pass into the section 2 of the laser amplifier. The light, with increased energy, is reflected by the mirror 6 to the window 5 at the end of section 1 of the laser amplifier. After leaving the window 5, the light passes through a quarter wavelength plate 11 and on to a mirror 12. The mirror 12 reflects the light back through the quarter wavelength plate 11. The polarisation plane of the light has now been rotated through 90° and the light re-enters the first section 1 of the laser through the window 5. The light is now reflected at the mirror 6 into section 2 of the laser. At the end of section 2, where the light first entered the laser amplifier, it is reflected off the Brewster angle element 10, because of its 90° polarisation change and is then turned back into section 3 of the laser amplifier by the mirror 13. After passing through section 3 it is reflected by mirror 8 into section 4 and so out through the exit window 9. Thus the initial low-power sections of the laser amplifier are used twice.

Figure 3:
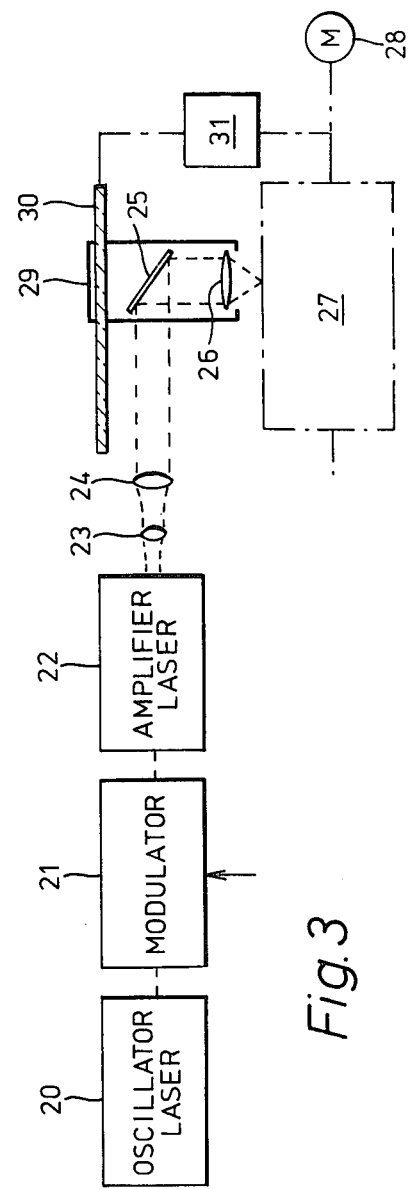
FIG. 3 illustrates diagrammatically a scanning image-reproduction apparatus in which the laser-beam generating apparatus according to the invention can advantageously be employed.

FIG. 3 illustrates a particularly advantageous application of this invention in which a laser is used to excavate material from a printing cylinder.

In FIG. 3, light from an oscillator laser 20 is passed to a modulator 21. The modulator is supplied with a signal representing density variations of a scanned original. The emergent modulated beam enters a multi-section laser amplifier 22, of the kind shown in FIG. 2, and thereafter passes through lenses 23 and 24, constituting a beam expander. Light from the beam expander is reflected by a mirror 25 and is focused by a lens 26 on to the surface of a drum 27 on which the image is to be formed. The drum is driven in rotation by a motor 28 and at the same time a housing 29 containing the mirror 25 and lens 26 moves along a lead screw 30 driven, through reduction gearing 31, by the motor 28. Thus the focused modulated laser beam traces a helical path on the drum surface and the resultant excavations on the surface of the drum represent the image to be reproduced.

The purpose of the beam expander represented by the lenses 23 and 24 is to maintain substantially constant the size of the spot formed at the surface of the drum, irrespective of the position of the head 29 along the lead screw. Without the lenses 22 and 23, the beam from the amplifier laser 22 would diverge in its passage to the lens 26 and consequently the changing path length from the laser to the drum as the head 29 moves along the lead screw would result in a changing spot size at the drum surface. The beam expander increases the beam width but reduces its divergence, so that after focusing the spot size remains substantially the same for the whole length of the drum.

In this specification, the term "light" is intended to include laser radiation outside the range of visible wavelength as well as visible laser radiation.

I claim:

1. Scanning image-reproduction apparatus, comprising: a laser oscillator, a modulator positioned to modulate an output light beam from the laser oscillator, a laser amplifier positioned to receive the modulated laser beam, and means for scanning an output light beam from the amplifier over the surface of a record medium, the laser amplifier comprising a plurality of laser sections optically arranged in series, means for passing a polarised light beam to be amplified into the plural section laser amplifier at an entry point in an intermediate section thereof and directing the light beam towards a first end of the laser amplifier, means for redirecting the polarised light beam back through the laser amplifier from said first end to an exit window at the other end of the amplifier, and means for rotating the plane of polarisation of the light beam through 90° to prevent its emergence at the original entry point, whereby the light beam obtained from the exit window has passed twice through the initial stages of the laser amplifier.

2. Apparatus in accordance with claim 1, in which the laser amplifier is a folded amplifier and the entry point is midway along said series of laser sections.

3. Apparatus in accordance with claim 1, in which the means for rotating the plane of polarisation of the light beam through 90° is located at said first end of the laser amplifier between said first end and a reflector constituting the redirecting means, the apparatus further comprising polarisation-sensitive means at the end of said intermediate section of the plural section laser amplifier, whereby the polarised light beam to be amplified enters the laser amplifier from a source of polarised light through said polarisation-sensitive means but is prevented by said polarisation-sensitive means from re-emerging, following its change of polarisation, on its second passage through said intermediate section of the laser amplifier.

4. Apparatus in accordance with claim 1, in which the polarised light beam initially enters the plural section laser amplifier by transmission through a Brewster-angle polarising element, said element reflecting the light beam on its return passage through the laser amplifier.

5. Apparatus in accordance with claim 4, in which the light beam is reflected by the Brewster-angle element onto a further reflector from which it enters the next section of the plural section laser amplifier.

6. Apparatus in accordance with claim 1, further comprising means focusing the beam onto said record medium surface, and a beam expander located between the laser amplifier output and said focusing means.

* * * * *